US005306455A

United States Patent [19]

Carroll

[11] Patent Number: 5,306,455

[45] Date of Patent: Apr. 26, 1994

[54] METHOD OF MAKING TUBULAR DUNNAGE

[76] Inventor: Hazen J. Carroll, 6340 Miller Rd., P.O. Box 780, Dearborn, Mich. 48121

[21] Appl. No.: 37,888

[22] Filed: Mar. 26, 1993

Related U.S. Application Data

[62] Division of Ser. No. 747,677, Aug. 20, 1991, Pat. No. 5,267,652.

[51] Int. Cl.⁵ .......... B29C 61/06

[52] U.S. Cl. .......... 264/145; 264/566; 264/161; 264/163; 264/209.3; 264/230; 425/304; 425/315

[58] Field of Search .......... 264/209.3, 563, DIG. 81, 264/566, 145, 151, 146, 163, 161, 230; 425/304, 308, 315

[56] References Cited

U.S. PATENT DOCUMENTS

| | | | |
|---|---|---|---|
| 2,539,372 | 1/1951 | Metzler | 164/17 |
| 2,879,886 | 3/1959 | Crane | 206/72 |
| 3,043,488 | 7/1962 | Warwick | 229/14 |
| 3,259,003 | 7/1966 | Griffin | 83/54 |
| 3,311,232 | 3/1967 | Howell | 206/65 |
| 3,344,916 | 10/1967 | Brueckner | 206/62 |
| 3,714,310 | 1/1973 | Gaffney et al. | 264/563 |
| 3,790,652 | 2/1974 | Colijn et al. | 264/146 |
| 3,872,194 | 3/1975 | Lowry et al. | 264/230 |
| 3,924,738 | 12/1975 | Poupitch | 264/159 |
| 3,932,569 | 1/1976 | Fuss | 264/209.1 |
| 3,935,357 | 1/1975 | Padovani | 264/209.1 |
| 4,007,538 | 2/1977 | Petrie | 264/145 |
| 4,030,392 | 6/1977 | Torres | 83/178 |
| 4,112,810 | 9/1978 | Driebelbis | 83/490 |
| 4,261,940 | 4/1981 | Bussey, Jr. | 264/151 |
| 4,566,831 | 1/1986 | Groth | 410/117 |
| 4,850,256 | 7/1989 | Radi | 83/17 |
| 4,879,932 | 11/1989 | Scalise et al. | 83/30 |
| 4,930,384 | 6/1990 | Nakatsuji | 83/54 |
| 4,979,620 | 12/1990 | Delamare et al. | 206/594 |
| 5,005,458 | 4/1991 | Merrick | 83/599 |

FOREIGN PATENT DOCUMENTS

| | | | |
|---|---|---|---|
| 55-48978 | 12/1980 | Japan | 264/145 |

*Primary Examiner*—Jeffery Thurlow
*Attorney, Agent, or Firm*—Brooks & Kushman

[57] ABSTRACT

A storage or shipping carton for automotive parts or the like has disposed therewithin layers of resilient tubular dunnage having part configured cut outs in the side walls. The dunnage extends transversely of the carton between two of the side walls while the parts extend transversely of the dunnage between the other two side walls. The tubular dunnage is preferably formed of low density polyethylene and the notches in the dunnage are formed by flattening the dunnage and severing the side walls thereof while in the flattened condition and then reopening the dunnage to its normal configuration.

13 Claims, 4 Drawing Sheets

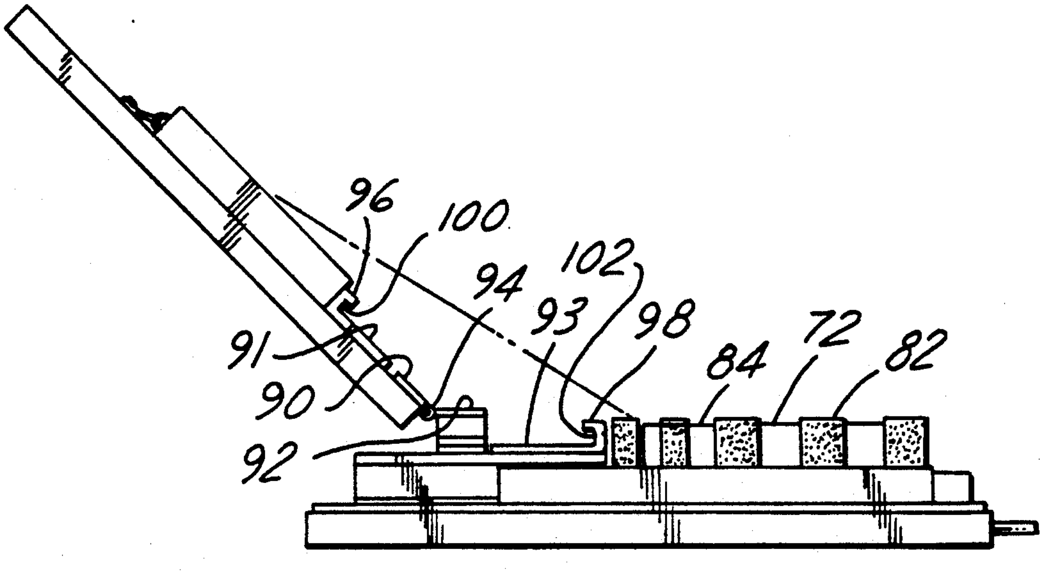
FIG.5
FIG.6
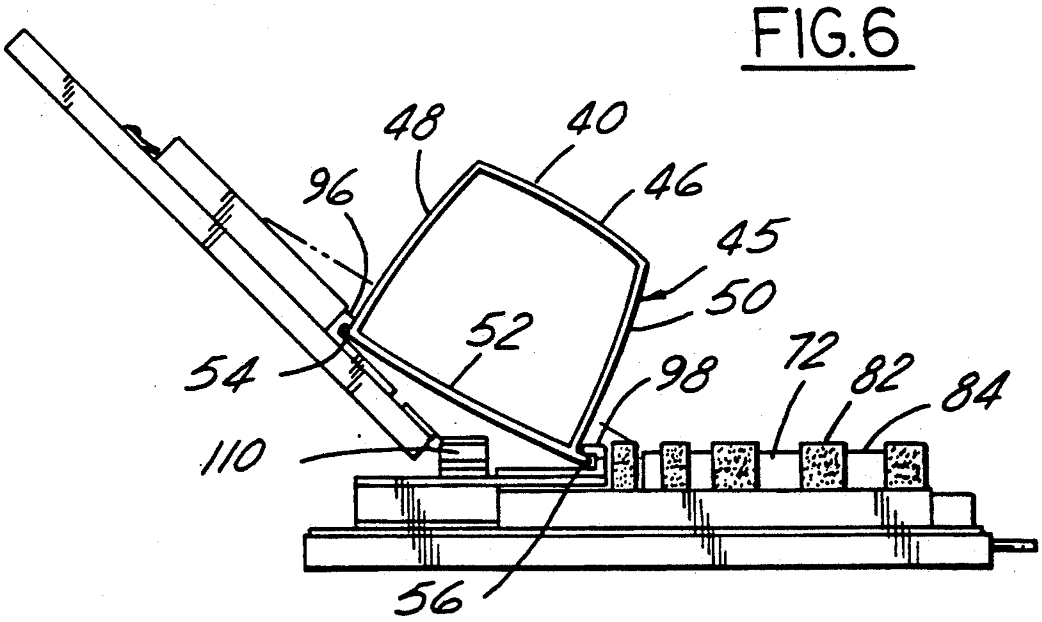

METHOD OF MAKING TUBULAR DUNNAGE

This is a divisional of copending application Ser. No. 07/747,677 filed on Aug. 20, 1991 now U.S. Pat. No. 5,267,652 issued Dec. 7, 1993.

FIELD OF INVENTION

This invention relates to a shipping or storage carton for products, a new type of dunnage for use in such a carton and a method of making such dunnage.

BACKGROUND OF THE INVENTION

The auto industry in the United States has been moving toward the elimination of foam packaging such as polystyrene and other foams for automotive parts, principally because of adverse environmental impact of such type dunnage, and accordingly, efforts are being directed toward providing a dunnage which is recyclable. This means the substantial elimination of a great deal of prior art dunnage heretofore used in the auto industry for the handling of automobile parts between the parts supplier and the automobile assembly plant. In general, such parts have been shipped in boxes having a bottom wall and side walls and a lid with the dunnage therein supporting the parts against abrasion and damage during shipment from the parts supplier to the final assembly plant and for storage at the plant.

SUMMARY OF THE INVENTION

As disclosed herein, I provide a shipping or storage carton made of conventional materials, such as cardboard, having a bottom, four side walls and a top closure. Within this carton I provide dunnage in the form of transversely slotted resilient plastic tubing. The tubing is of a length to substantially bridge between two opposed side walls while the length of the parts to be packaged extends transversely between the other two side walls. In a preferred arrangement, the dunnage is arranged in layers with the parts to be shipped or stored extending transversely between cooperating pairs of the tubular dunnage. The slots in the dunnage are shaped to conform to the parts to be handled so that the parts will nest in the slots. The design of the tube and the nature of its plastic material provides a resiliency which serves to cushion the part nested in the slots.

More specifically, my tubular dunnage is formed with curved side walls such that the curvature thereof may provide a resilient arch to cushion the parts being shipped or stored as they rest in the cut outs in the tubing. The plastic used in the manufacture of the tubing may be low density polyethylene and is preferably designated by suppliers as LDPE. In addition, polyvinylchloride and high density polyethylene as well as polypropylene may be used.

Because of the resilient nature of the tubing, conventional methods of forming the transverse slots such as shown in U.S. Pat. Nos. 2,539,372, 3,259,003, 4,112,810 and 4,930,384 did not appear satisfactory and I therefore developed a novel method of transversely slotting the resilient tubing. More specifically, tubing is placed within a clam shell fixture having upper and lower hingedly connected platens, one of which carries a steel rule die or dies. The tube is configured with a pair of longitudinally extending flanges. The clam shell fixture has a pair of shoulders which cooperatively engage the flanges to locate and hold the tube between the platens as the platens are swung toward a closed position. In addition, means are provided for supporting the tubing out of contact with the cutting edge of the steel rule die until the final increments of platen closure. As the platens are moved from an open position at which the tube is inserted between them and the tube flanges engaged in the retaining shoulders, toward a closed position, the tube is flattened until the side wall (or walls) are collapsed upon each other in firm compressed engagement. In the final increments of platen closure with the tube collapsed and compressed the cutting die or dies sever the tube walls. Upon opening the platens the tube is stripped from the dies and re-expands and the severed cut outs are removed therefrom to provide the product receiving notches.

BRIEF DESCRIPTION OF THE DRAWINGS

FIG. 5 is an end view of the clam shell fixture shown in FIG. 2 before a plastic tube is inserted therein for slotting;

FIG. 6 is similar to FIG. 5 but shows plastic tubing therein preparatory to closing the fixture;

BRIEF DESCRIPTION OF PREFERRED EMBODIMENTS

Figure 1:
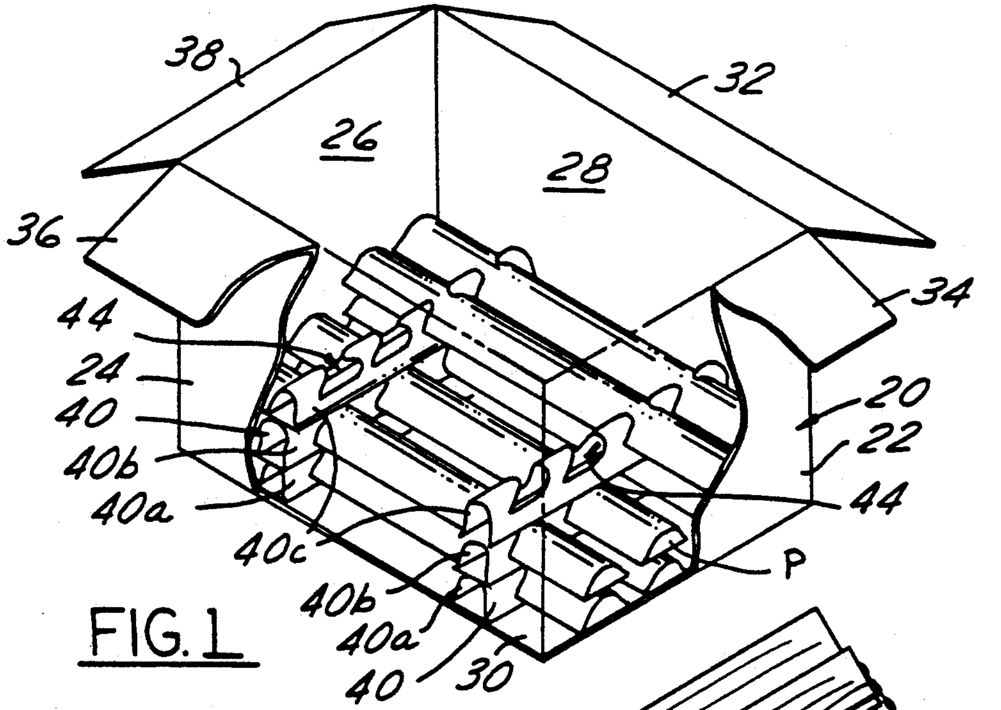
FIG. 1 is a perspective view of a shipping or storage carton embodying my invention with the carton partially broken away to show the interior thereof.

A shipping or storage carton embodying my invention is shown best in FIG. 1 at 20 and comprises a conventional cardboard or similar box having four connected side walls 22, 24, 26 and 28, a connected bottom wall 30 (which may comprise several flaps), and four hinged lid flaps 32, 34, 36 and 38. The box is sized in one dimension, as between opposed walls 22 and 26, to accept the length of the products P to be shipped or stored. Within the box is disposed laterally spaced apart lengths of tubular dunnage 40, the length thereof being such as to slidably fit between the other opposed walls 24 and 28 of the box. The dunnage is laterally arranged in pairs 40*a*, 40*b*, 40*c*, etc., which cooperatively support a plurality of the products P. In the embodiment shown, each pair of the tubes supports four of the elongated products P arranged in layers in the box. It is to be recognized, of course, that more or less numbers of products could be supported by the dunnage depending upon the size of the products, their weight, and the size of the box. For example, a single piece of tubular dunnage might be received in a box to support a single product or conceivably three or more lengths of tubular dunnage could span a box and support anywhere from one to a dozen or more products thereon.

Figure 4:
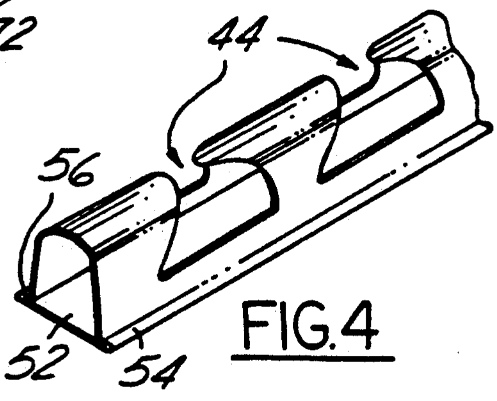
FIG. 4 is similar to FIG. 3 but shows typical transverse slotting to receive parts for shipment or storage.
Figures 9, 10:
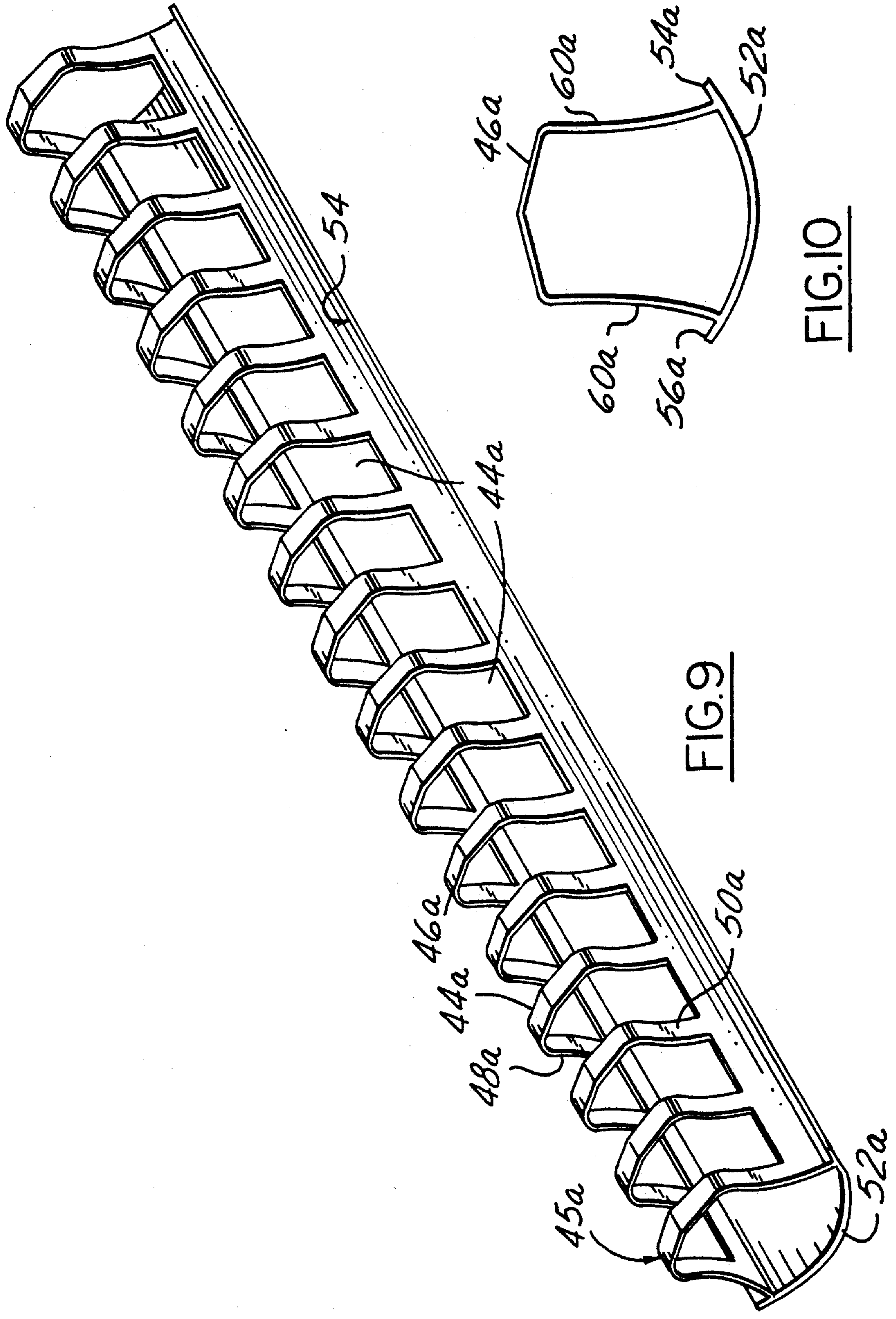
FIG. 9 is a perspective view of another configuration of the dunnage.
FIG. 10 is an end view of FIG. 9.

Each length of the tubular dunnage has been transversely slotted to provide product configured openings best shown in FIGS. 1, 4 and 9, at 44 and 44*a*. As the tubular dunnage shown in FIGS. 9 and 10 corresponds to that of FIGS. 1 and 4, except for the configuration of the slots or openings and the curvature of the sidewalls of the tubular dunnage, alpha suffixes are used to represent generally corresponding parts. The slots are adapted to receive in nesting relation the product and cushion the same in supported relation in the box. For this purpose, the slots or cut outs 44 are designed to conform to the shape of the product so that when the product is inserted in the slots it is closely support therein by the tube walls.

Figure 3:
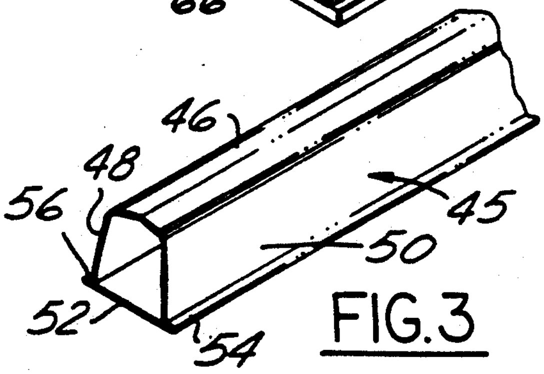
FIG. 3 is a perspective view of a length of the recyclable resilient plastic tubing from which the dunnage is formed.

The tubes from which the dunnage is formed is preferably made by extrusion in a well-known fashion. It is made of a recyclable resilient plastic, and the wall thickness should be such as to permit the tube to flex in use and during its manufacture, while still supporting the products out of contact with other products in the box. The preferred plastic for manufacture of the tubes is low density polyethylene (LDPE). This material may be chopped up after use, remelted, perhaps with some additional virgin LDPE added, and then reformed for use as hereinafter mentioned. I have had good success with LDPE tubes having a wall thickness between 0.040 and 0.060 inches, though other wall thicknesses may be chosen depending on the parts to be supported and the plastic being used for the dunnage. Other plastics may be used provided they are recyclable, and sufficiently resilient to give a cushioned support of the product and to permit the collapse of the tube walls and reforming thereof during the manufacture of the dunnage. Materials such as PVC (polyvinylchloride), high density polyethylene and polypropylene may be used. The sidewall or walls of the tubes are preferably somewhat curvate adjacent the cut outs or slots 44 and 44*a*. The tube may, in fact, have an inverted U-shaped portion 45 (see FIGS. 3, 6 and 9) having a crown 46 opposed side walls 48 and 50 and a bottom wall 52. The curvate shape of these walls lends a resiliency to the plastic tube permitting it to support the products P in a cushion-like fashion in the cut outs 44 and 44*a*.

At the juncture between the U-shaped portion 45 and the bottom wall 52 of the tube, a pair of oppositely extending flanges 54 and 56 project laterally of the tube and extend along the length thereof. In addition to strengthening the tube, these flanges serve to cooperate with the clam shell fixture, hereinafter described, to locate the tube for cutting out of the product nesting notches 44 and 44*a*.

Notches or cut outs 44 and 44*a* in the tubes have edges 58 that are shaped to closely conform to the configuration of the product so that the cut outs will embrace the product and the latter will fairly nestle in the dunnage. Accordingly, some cut outs may appear as in FIG. 4 while other notches may be simply parallel sided grooves as in FIG. 9. The slots are spaced apart along the length of the tubes distances sufficient to space apart the products P whereby adjacent products are held out of contact with each other.

Preferably the length of the tubular dunnage is a slip fit between the side walls 24 and 28 of the box 20 whereby the dunnage is essentially trapped between such walls. With products P disposed in the notches or cut outs 44 of the tubular dunnage, the dunnage is constrained against any appreciable lateral movement.

Adjacent the edges 58 of the cut outs or notches 44, the dunnage may be curved to form a resilient arch 60*a* best shown in FIG. 9 which is designed to flex and act to cushion the products nestled in the notches. Similarly, the bottom wall 52*a* in FIG. 10 is arched to facilitate flexing of the dunnage and cushion the product resting in the notches 44*a*. While the curvature of the walls is more pronounced in the embodiment of FIGS. 9 and 10, such curvature is also present albeit to a lesser extend in the embodiment of FIGS. 3 and 4.

In use, the box 20 may be delivered to the user in a knocked-down or flattened condition and opened up just prior to use. A pair 42*a* of the tubular dunnage is then placed in the box with the tubes in laterally spaced apart relation and with the cut outs 44 aligned and with the bottom wall 52 of the tubular dunnage resting on the bottom 30 of the box. The product is then inserted in the box and nested in the cut outs 44. In the embodiment shown, four products P will fill one layer. Optionally, a paper or cardboard separator (not shown) may then be laid down over such layer. A second pair of tubular dunnage 42*b* is then placed in the box over the first pair (or over the separator) and product is again inserted in the cut outs 44 to form a second layer. This is repeated with pair 42*c* and successive pairs until the desired number of layers have been placed in the box and the lid may then be closed for shipment and storage.

This type dunnage may be used in packaging a wide variety of products from automotive cam shafts or crank shafts to automotive trim molding. It is believed that this tubular dunnage may be utilized in virtually any application where the prior art foam type dunnage has been used.

Figure 7:
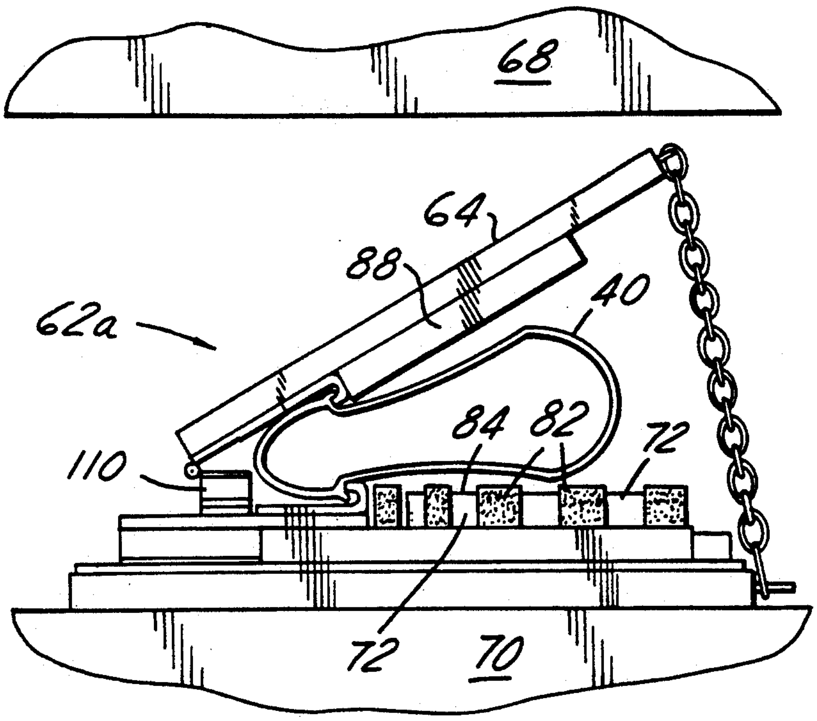
FIG. 7 corresponds to FIG. 6 but with the fixture partially closed, squeezing the tubing toward the collapsed position, and preparatory to closing the press.
Figure 8:
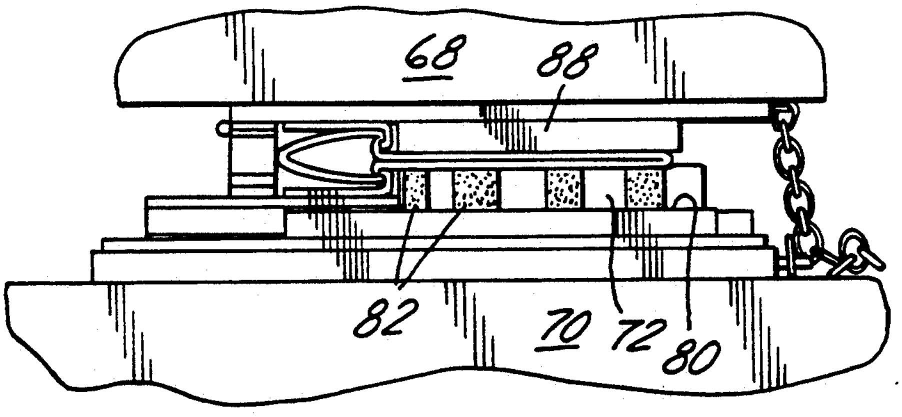
FIG. 8 shows the fixture completely closed and with the plastic tubing being slotted.

Because of the resiliency or flexibility of the tubes, conventional techniques for cutting the notches therein were unsatisfactory and FIGS. 2 and 5–8 I show a preferred method of forming the slots. I provide a clam shell fixture 62 shown in perspective in FIG. 2 having upper and lower platens 64 and 66 movable between open and closed positions. The fixture is intended to have a tube 40 inserted therein as in FIG. 6 when the fixture is in the wide open condition, and the fixture is then partially closed to squeeze the tube, and while held in this position, the fixture is then bodily moved to a position disposed between a pair of press plates 68 and 70 of a press (not shown) as disclosed in FIG. 7. The press is then closed to urge the upper and lower platens of the fixture toward each other as shown in FIG. 8 and cut out the notches in the tube. Just prior to such severing of the notches, the opposed walls of the tube are brought into juxtaposition so that the severing may be accurately and quickly performed. Upon opening the press, the upper and lower platens of the fixture separate, the tube is stripped from the dies and the tube is removed from the fixture with the notches 44 then in place.

The lower platen 66 is made up of several layers of plywood and metal plate to form a dimensionally stable yet lightweight flat generally planar structure. A series of steel rule dies 72, 74, 76 and 78 project above the upper face 80 of the lower platen. The dies are configured to cut out the appropriate shape slot or notch to fit the configuration of the product to be received in the dunnage tubes. Means in the form of elastomeric blocks 82 are positioned on the upper face 80 of the lower platen around and adjacent the dies and project slightly above the cutting edge 84 thereof to support the tubing between the platens out of contact with the sharp edges of the dies until the press closes and to strip the plastic tubing off the dies when the press opens.

The term "steel rule die" refers to a conventional type of cutting die used in the paper and plastics industries comprising a relatively thin blade arranged in a vertical position and projecting upwardly from a supporting surface. The exposed upper edge of the blade is sharpened such that when a sheet of paper or plastic is pressed down thereagainst the die will sever therethrough.

The upper platen 64 is provided with a backing member 86 formed of plywood or the like to which is fastened a flat plate 88 as of metal, which is intended to kiss the sharpened edge of the steel rule die when the platens are closed as in FIG. 8. The platens are hinged together by cooperating hinge plates 90 and 92 pivotally connected at 94 along an axis which lies substantially in the plane of the cutting edges of the die 72, 74, 76 and 78.

Means are provided for engaging, locating and holding a length of plastic tubing 40 in proper position in relation to the steel rule dies in the fixture during closing thereof. Such means cooperates with the flanges 54 and 56 and the bottom wall of the tubing. Such means comprises a pair of elongated, hook shaped retaining shoulders 96 and 98 secured respectively to the upper and lower platens 64 and 66. The shoulders 96 and 98 may be simply J-shaped extrusions 91 and 93 secured to the platens in any convenient fashion—not shown—and disposed closely adjacent the dies as shown in FIGS. 5–8. The shoulders define opposed channels 100 and 102 when the fixture is wide open which generally face each other or are otherwise so arranged that a length of the plastic tubing disposed between the plates may have the oppositely extending flanges 54 and 56 received therein as shown in FIG. 6.

Said means for engaging, locating and holding the plastic tubing also includes a member for engaging the bottom wall 52 of the tube to hold the tube flanges 54 and 56 in the channels 100 and 102. Such member in the embodiment shown comprises a block 110 which supports the hinge plate 92 and is positioned to engage the bottom wall portion 52 of the tube as the tube is flattened and urge the flanges 54 and 56 into the channels of the retaining shoulders. Thus, a three point or three line location of the tube between the fixture platens insures that the tube is properly located for severing by the steel rule dies.

Figure 2:
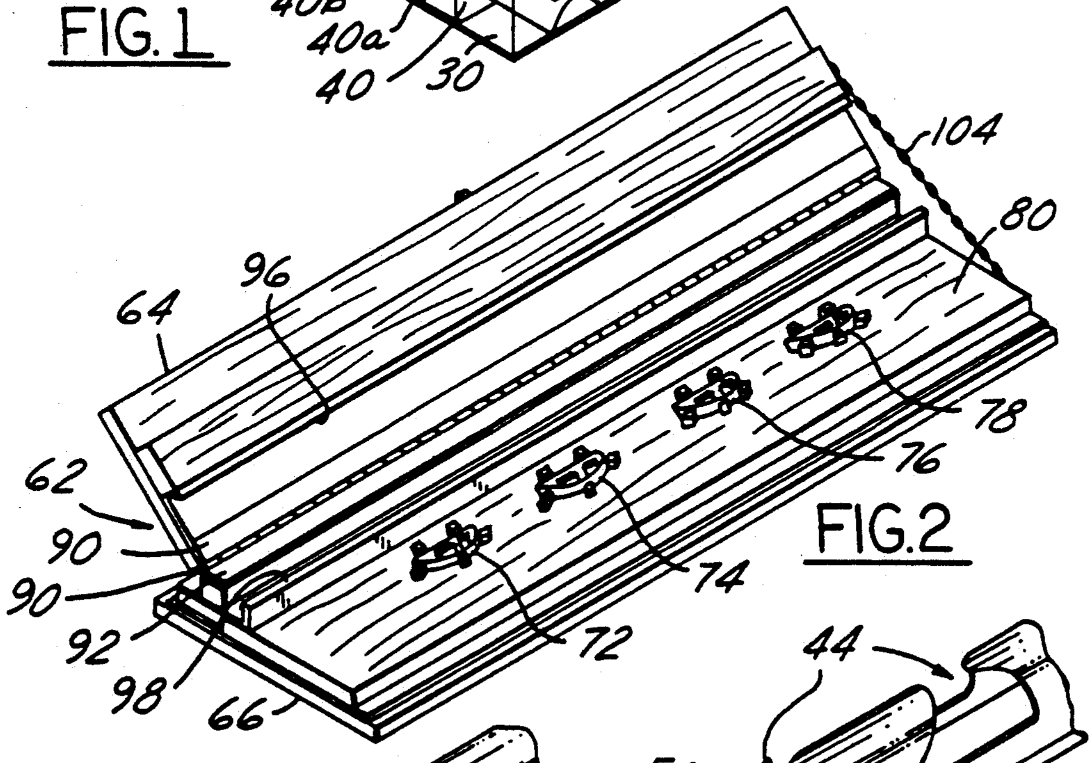
FIG. 2 is a perspective view of the clam shell fixture for forming the product configured notches in the tubular dunnage shown in the open condition.

Platen holding means 104 comprising a length of chain secured to the ends of the platens will hold then open in the position shown in FIGS. 2, 5 and 6 to receive the plastic tubing.

After the tube has been placed between the platens and the flanges 54 and 56 engaged in the channels of the retaining shoulders as best shown in FIG. 6, the platens are partially closed to the intermediate position shown in FIG. 7 and temporarily held in such position by retaining means 106 comprising a length of chain or the like fixed at the upper end to the front edge of the upper platen 64 with the opposite end hooked over a pin 108 projecting from the front of the lower platen 66. In this condition, the fixture is bodily moved to a position between a pair of press platens 68 and 70 in a conventional press, not shown. The press is then activated to move the press plates 68 and 70 toward each other to first engage and then squeeze the clam shell platens together, flattening the tube so that the side walls are compressed into engagement or juxtaposition as shown best in FIG. 8. As this occurs, the tube compresses the elastic blocks 82, which have up to this point held the tube up away from the sharp edges of the dies, and the sharp edges enter into severing engagement with the tube walls and the dies are forced through the tube walls and into kissing contact with the flat plate 88 of the upper platen. Thus, the tube is flattened before it is notched in a two step process. In the first step, the tube is inserted into the wide open fixture and upon partial closing of the fixture the tube is partially flattened as between the FIGS. 6 and 7 positions. This may be accomplished manually outside of the press and the retainer chain 106 is connected to hold the tube partially collapsed and the tube in proper position for the notching operation. In the second step the fixture is placed between the press plates 68 and 70 of the press and the plates move toward each other as above-mentioned. The side walls of the tube are moved into flush juxtaposition with the tube fully flattened just as the severing of the walls occurs to produce the notches.

Upon separation of the press plates 68 and 70, the fixture is removed from between the press plates. The inherent resiliency of the tube will tend to open the fixture platens back to the FIG. 7 condition, from which the fixture may be further manually opened and the slotted tube removed. The elastomeric blocks 82 will help to strip the plastic tubing off the dies and thus aid in freeing the tubing from the lower platen. If necessary the tube may be partially squeezed across the opposite diameter from that squeezed in the press to facilitate returning tube to its initial tubular configuration. The tube, freed from the fixture, will normally return to its preflattened condition without assistance.

What is claimed is:

1. The method of making resilient slotted tubular dunnage for supporting products comprising the steps of:

- forming an elongated plastic tube having resilient side walls;
- flattening the tube by compressing together opposed side walls;
- while holding the tube flattened, cutting product configured openings through the side walls; and
- reopening the tube.

2. The method of slotting resilient plastic tubing to make dunnage comprising the steps of:

- flattening a length of the tubular dunnage by compressing together and into contact opposite side walls thereof;
- while holding the side walls compressed together, cutting openings transversely therethrough to accommodate products to be handled; and
- reopening the tubing to substantially its original tubular configuration.

3. The method of making resilient slotted tubular dunnage for supporting a product comprising the steps of:

- extruding an elongated plastic tube having resilient side walls;
- flattening the tube by compressing together and into abutting contact the resilient side walls;
- while holding the tube thus flattened, cutting a product configured opening through said side walls; and
- reopening the tube.

4. The method defined by claim 3 characterized by removing the scrap of said side walls within the configured opening to form a product receiving slot in the tube.

5. The method defined by claim 3 wherein several product configured openings are cut through the flattened tube before it is reopened.

6. The method of slotting the walls of a resilient tube to make dunnage for supporting a product in the slot, comprising the steps of:

flattening the tube by compressing together and into contact the walls of the resilient tube;

while holding the tube thus flattened, cutting a product receiving opening through the walls; and reopening the tube.

7. The method of claim 6 characterized in that following the cutting of the product opening through the walls the scrap is removed from the tube.

8. The method of claim 6 characterized in that several product receiving openings are cut through the flattened tube before it is reopened.

9. The method of claim 8 wherein the several product receiving openings are cut substantially simultaneously through the flattened tube.

10. The method of making slotted resilient plastic tubular dunnage for supporting products comprising the steps of:

extruding an elongated plastic tube having resilient side walls with a pair of oppositely outwardly projecting flanges extending lengthwise of the tube;

engaging said flanges to position the tube between opposed cooperating die cutting members;

flattening the tube by squeezing together and into abutting contact the resilient side walls and while held so flattened moving the cooperating die cutting members toward each other to cut through said side walls to form at least one slot; and separating the opposed die cutting members and removing the slotted plastic tube from therebetween.

11. The method as defined in claim 6 and further comprising aligning the tube in a predetermined location before said flattening step.

12. The method as defined in claim 11 wherein said tube includes opposed side flanges and further comprising the step of aligning said flanges before said flattening step.

13. The method as defined in claim 11 wherein said aligning step comprises inserting said flanges in channels of spaced die parts.

* * * * *